United States Patent [19]

Weerts et al.

[11] Patent Number: 5,333,632
[45] Date of Patent: Aug. 2, 1994

[54] SOIL ROASTER FOR CLEANING HYDROCARBON CONTAMINATED SOIL

[76] Inventors: Allen L. Weerts, 907 N. 21st St., Superior, Wis. 54880; Richard E. Ledin, Rte. 1, Box 247, Maple, Wis. 54854

[21] Appl. No.: 870,048

[22] Filed: Apr. 16, 1992

[51] Int. Cl.$^5$ ............................................. B08B 3/10
[52] U.S. Cl. ............................ 134/105; 134/111; 134/19; 110/215
[58] Field of Search ................ 134/14, 105, 111, 108; 110/224, 246, 236, 215

[56] References Cited

U.S. PATENT DOCUMENTS

| | | | |
|---|---|---|---|
| 3,346,417 | 10/1967 | Ehrlich | 110/236 |
| 3,598,649 | 8/1971 | Juhasz | 134/2 |
| 3,938,450 | 2/1976 | Jaronko et al. | 110/246 |
| 4,411,695 | 10/1983 | Twyman | 134/19 X |
| 4,624,190 | 11/1986 | Cappi | 110/215 |
| 4,625,661 | 12/1986 | Melchior | 110/215 |
| 4,704,972 | 11/1987 | Marchand | 110/215 |
| 5,046,435 | 9/1991 | Kugler | 110/246 |
| 5,111,756 | 5/1992 | Anderson | 110/236 |
| 5,121,699 | 6/1992 | Frank | 110/246 |
| 5,152,233 | 10/1992 | Spisak | 110/246 |
| 5,193,291 | 3/1993 | Brashears | 110/246 |

Primary Examiner—Frankie L. Stinson
Attorney, Agent, or Firm—Patterson & Keough

[57] ABSTRACT

This invention comprises a small, mobile, energy-efficient, batch-type soil roaster which can be utilized directly at a contamination site. Hydrocarbon contaminated dirt or soil is placed into a rotating drum. The soil is fired or roasted utilizing a burner until all hydrocarbons are completely evaporated out of the soil. The hydrocarbon gases that are vaporized from the soil go through a water scrubber filter and an afterburner system where the hydrocarbon component of the vapors or gases are burned off and destroyed at high temperatures. A vortex effect is created within the integral afterburner/stack unit, causing the hydrocarbon gases to remain in the stack longer, thereby ensuring a more complete burning of the hydrocarbons.

18 Claims, 13 Drawing Sheets

SOIL ROASTER FOR CLEANING HYDROCARBON CONTAMINATED SOIL

FIELD OF THE INVENTION

This invention relates to processing equipment for cleaning contaminated matter. More particularly, this invention relates to soil roasters used to clean petroleum contaminated soil.

BACKGROUND OF THE INVENTION

Soil roasters currently used in the industry are large, cumbersome pieces of equipment which are semi-portable or permanently positioned at designated soil roasting sites. Generally, the contaminated dirt or soil at a location or contaminated site is excavated, and the condition of the soil is tested to determine the level of contamination. The contaminated soil is then placed into containers or trucks and categorized. Finally, the dirt is transported to a designated safe soil roasting site by train or by truck.

At the safe soil roasting site, the contaminated soil is processed using a continuous flow process where soil is continuously fed into sprocket drive drums which rotate on internal axial shafts or outside bearings. Hydrocarbon contaminates are burned or vaporized from the contaminated soil in the drum, are generally passed through a baghouse or water scrubber filter to separate the hydrocarbons from dust particles, and are then passed through an afterburner to burn and eliminate the hydrocarbons. Clean air is emitted into the atmosphere through a separate exhaust stack.

Soil roasters presently available have several disadvantages. First, the contaminated soil is processed at a pre-set time and temperature. If the soil is highly contaminated or has a high moisture content, it is unlikely that the soil will be decontaminated to a desired parts per million (ppm) concentration because of the fixed time and temperature parameters. In addition, a safe soil roasting site requires more monitoring and supervision by state pollution control agency personnel to insure that all procedures are being performed correctly. Utilization of state pollution control agency personnel in this manner diverts state funds which could be utilized more productively for much needed cleanup projects. In addition, the large, stationary or semi-portable soil roasters currently being utilized consume large quantities of fuel and water to continuously process the contaminated soil. Finally, the afterburner systems which are used are separate from the stacks which emit the clean air into the atmosphere, resulting in a less efficient burning and cleaning of the air to be emitted.

SUMMARY OF THE INVENTION

This invention comprises a small, mobile, energy-efficient, batch-type soil roaster which can be utilized directly at a contamination site. The system is about eighteen feet long, seven feet wide and eight feet in height with the stack down and weighs about 20,000 pounds. Hydrocarbon contaminated dirt or soil is placed into a rotating drum suspended by wheels and rollers on the outside of the drum. While the drum is rotating, the soil is fired or roasted utilizing a burner. The length of time of the soil within the drum is variable, depending on the contamination level or moisture content of the soil batch. After all hydrocarbons are completely evaporated out of the soil, the soil is ejected by tilting the drum. The clean soil can be used at the site as uncontrolled fill.

The hydrocarbon gases that are vaporized from the soil go through a water scrubber filter which includes spray nozzles. The water removes dust and dirt particulates from the hydrocarbon vapors. The hydrocarbon vapors or gases exit the water scrubber filter and proceed to an afterburner system where the hydrocarbon component of the vapors or gases are burned off and destroyed at temperatures exceeding 1400° F. A vortex effect is created within the integral afterburner/stack unit, causing the hydrocarbon gases to remain in the stack longer, thereby ensuring a more complete burning of the hydrocarbons. Clean air is emitted into the atmosphere from the stack.

DETAILED DESCRIPTION OF THE INVENTION

The soil roaster system 20 of the present invention can be utilized to clean hydrocarbon contaminated soil, or other hydrocarbon contaminated materials. The contaminated material is subjected to intensive thermal heating for variable time periods in a rotating tumbler. After all hydrocarbons are evaporated, the material is ejected from the tumbler and used at the site.

The vaporized hydrocarbons exit the tumbler and pass through a water scrubber filter box where dust and dirt particulates are removed from the hydrocarbon gas. Hydrocarbon gas exits the water scrubber filter, passes through an exhaust guide in a plenum assembly, and enters the integral afterburner/stack assembly. The hydrocarbon gases are subjected to a vortex effect within the stack assembly, which ensures a longer residence time within the stack and a more complete burning of the hydrocarbons. Clean air is emitted from the stack into the atmosphere.

Figure 1:
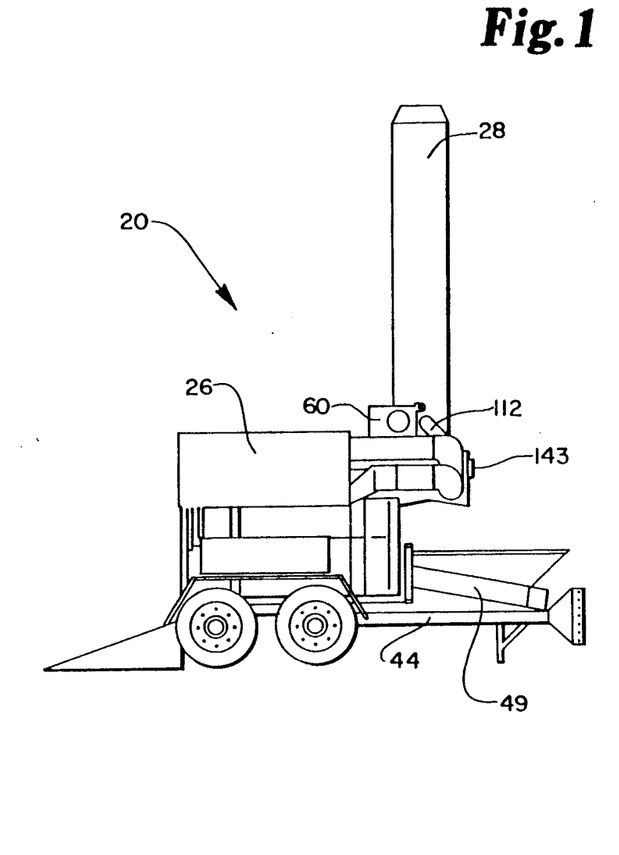
FIG. 1 is a side elevation view of a first side of a mobile soil roaster system in accordance with the present invention.
Figure 2:
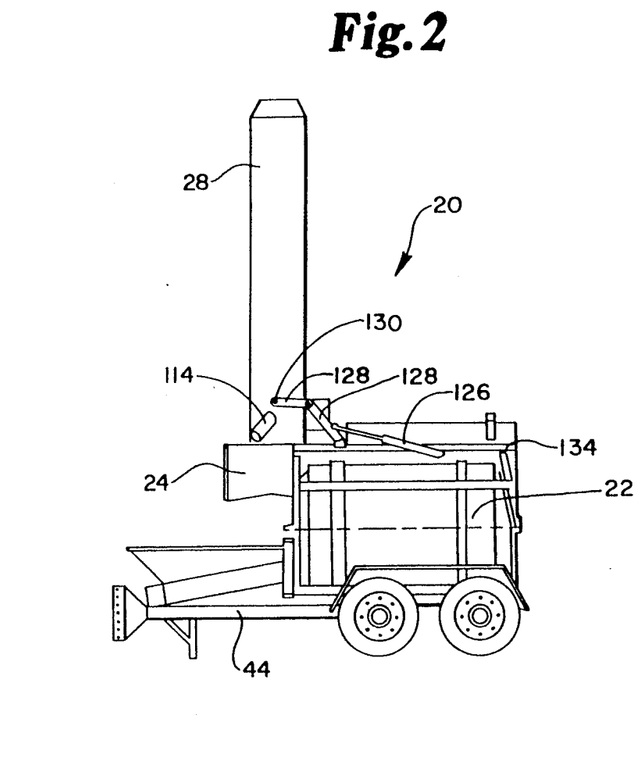
FIG. 2 is a side elevation view of a second side of mobile soil roaster system in accordance with the present invention.

Referring to FIGS. 1 and 2, soil roaster system 20 broadly comprises drum assembly 22, plenum assembly 24, water scrubber filter box assembly 26 and afterburner/stack assembly 28. Drum assembly 22 is shown in more detail in FIGS. 3-6. Drum assembly 22 broadly comprises cylinder or drum tumbler 30, front drum face plate 32, rear drum door/face plate 34, wheels 36, and frame assemblies 31, 38, 45.

Figure 3:
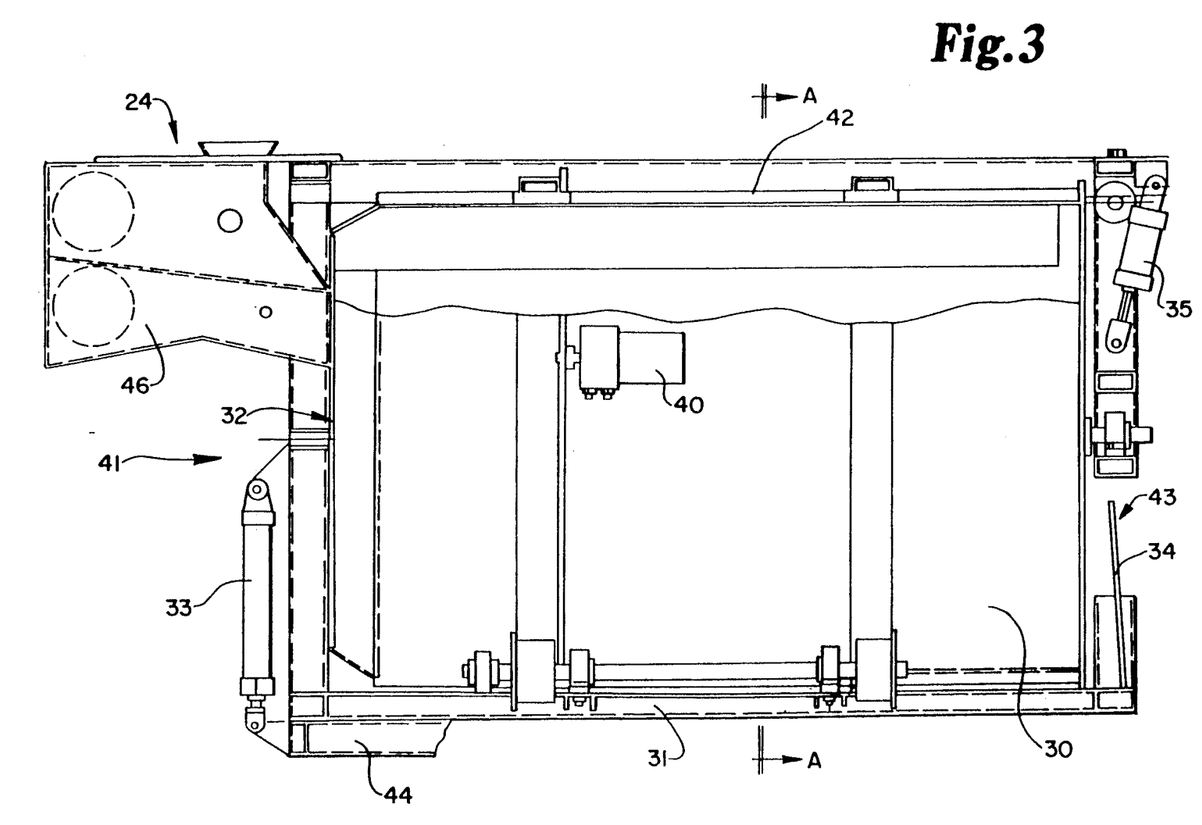
FIG. 3 is a side elevational view of the drum cylinder shown in FIG. 2.

As shown in FIG. 3, drum 30 is substantially surrounded by an insulating material 42, and is supported by main frame or chassis 44. Alternatively, chassis 44 could be a trailer mounted on twin axles. Front drum face plate 32 is positioned at the front end 41 of drum 30, and rear drum door 34 is positioned on the opposing end of drum 30. Rotation of drum 30 is initiated by hydraulic drive motor 40. Exhaust chamber 46 of plenum assembly 24 is positioned above front drum face plate 32 and is adjacent drum 30. Drum 30 can be tilted in drum frame assembly 31 using hydraulic component 33.

Figure 4:
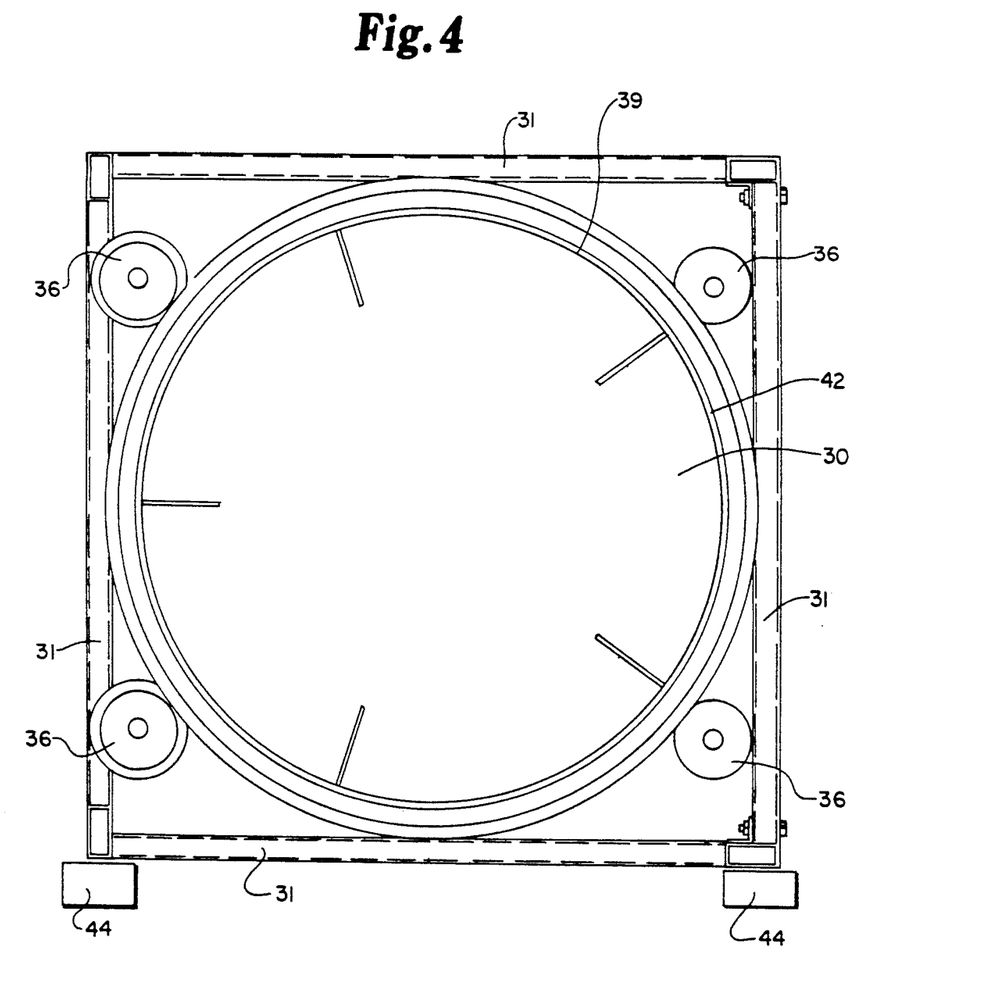
FIG. 4 is a sectional view of the drum taken along line A—A of FIG. 3.

Referring to FIG. 4, drum tumbler 30 is suspended against wheels 36 and rollers 37 (not shown) on the outside surface 39 of drum 30. Wheels 36 are freespinning, are of approximate equal size, and are positioned at selected positions around drum 30, thus aiding in rotation of drum 30. Wheels 36 are positioned between drum 30 and drum frame assembly 31. Drum 30 can be of varying shapes, although cylindrical is preferred for ease of rotation.

Figure 5:
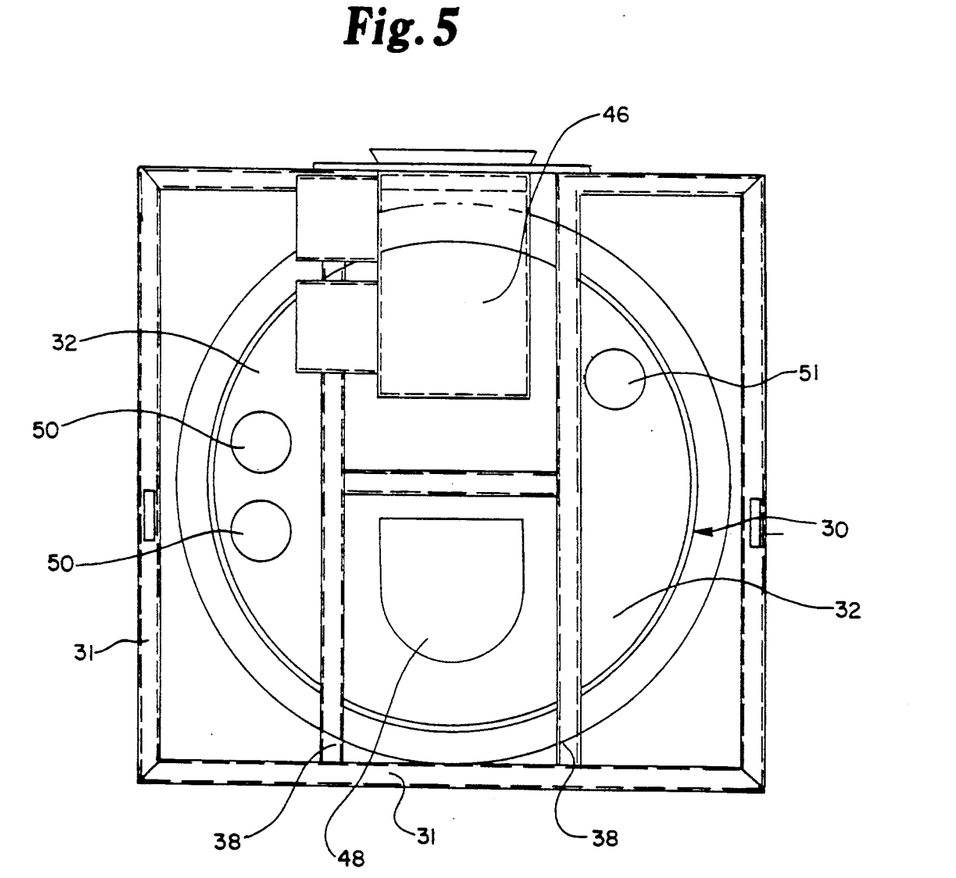
FIG. 5 is a front elevational view of the drum cylinder shown in FIGS. 2 and 3.

Referring to FIG. 5, a front view of the front end 41 of drum tumbler 30 is shown. Front drum face plate 32, adjacent the front end 41 of drum 30, is attached to the face plate frame 38 by U bolts (not shown). Front drum face plate 32 is stationary. A temperature monitoring device, such as thermometer 47 (not shown) is preferably mounted on or near front drum face plate 32. Auger port 48 is positioned below exhaust chamber 46, and receives the auger feed unit 49, shown in FIG. 1. Burner opening 50 is positioned along one side of cylinder 30. The burner 52 (not shown) contained within burner opening 50 is generally a liquid propane gas (LPG) burner utilizing liquid propane (LP). Preferably, burner 52 will output two million to three million BTU's per hour. Inspection hole 51 is positioned adjacent to exhaust chamber 46.

Figure 6:
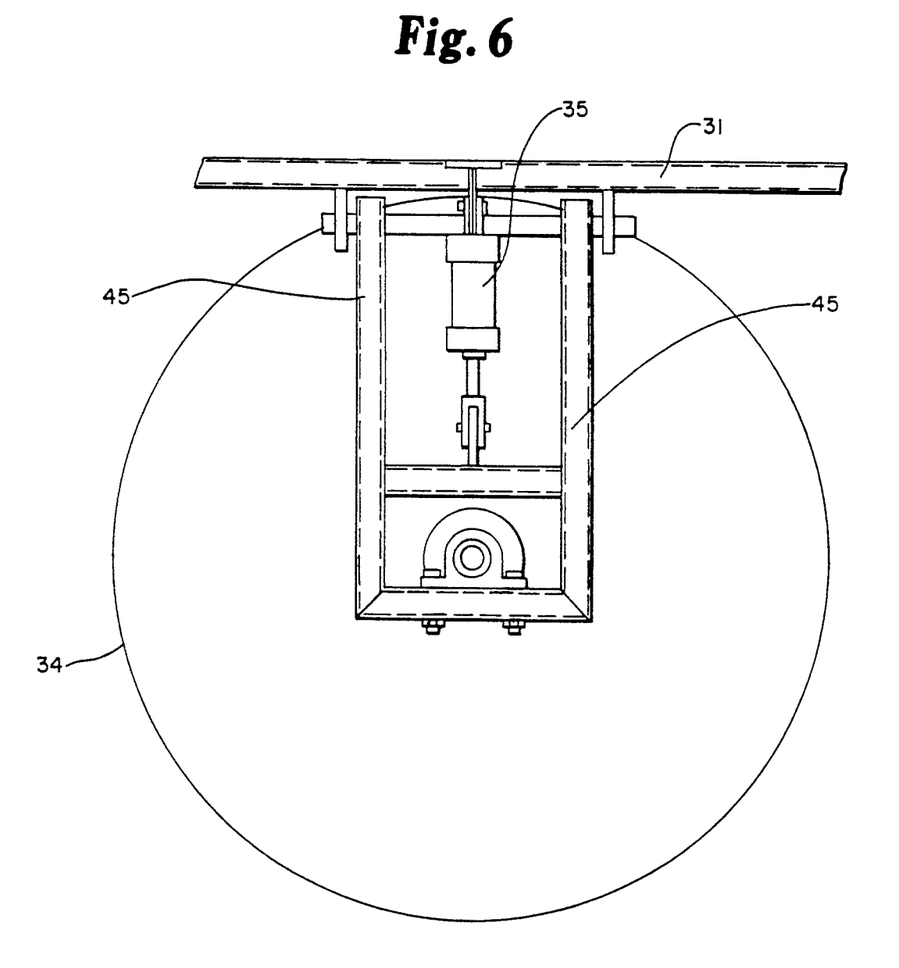
FIG. 6 is a rear elevational view of the drum cylinder shown in FIGS. 2 and 3.

Rear drum door 34 is shown in FIG. 6. Rear drum door 34 is positioned on the rear, opposing end 43 of drum 30 to front drum face plate 32, and is opened and closed using hydraulic component 35. Rear drum door 34 rotates with drum 30. Rear drum door 34 is attached to door frame assembly 45 by a bearing shaft (not shown). Hydraulic cylinder 35, shown in FIGS. 3 and 6, exerts pressure against rear drum door 34 to keep drum 30 closed.

Drum 30 is preferably made of a carbon steel material. Insulating material 42 is any high temperature insulation material, such as, for example, a 2300° F. ceramic material. Frame assemblies 31, 38, 45 may be made of square steel tubing of different sizes.

Drum 30 is rotated, subjecting the hydrocarbon contaminated soil or other material from a local site to heating by burner 52. The heat from burner 52 causes the hydrocarbons in the contaminated soil to vaporize. The cleaned soil is expelled out of drum 30 for use at the local site.

Figure 7:
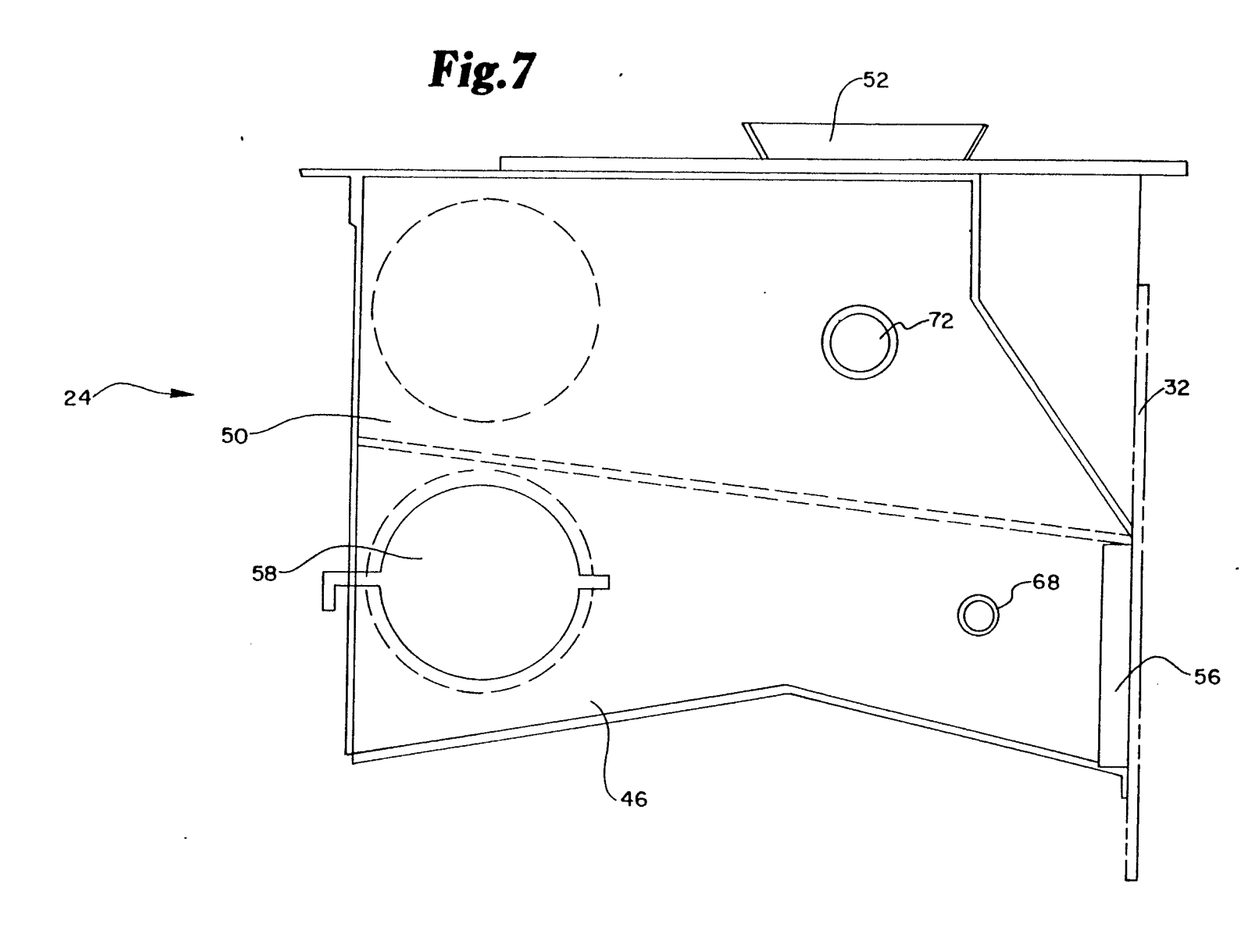
FIG. 7 is a side elevational view of the plenum assembly shown in FIG. 2.

Referring now to FIGS. 7-10, plenum assembly 24 broadly comprises plenum 50, exhaust chamber 46, exhaust guide 52, and spray nozzle 54. As seen in FIGS. 1 and 7, drum exhaust inlet 56 is positioned adjacent front drum face plate 32 and drum 30. Damper 58 is positioned within plenum 50 at an end opposite of drum exhaust inlet 56. Exhaust guide 52 extends into afterburner/stack assembly 28. Draft inducer unit 60, best seen in FIGS. 1 and 11, rests on top of plenum assembly 24 adjacent afterburner/stack assembly 28. Afterburner/stack assembly 28 is positioned between exhaust guide 52 and draft inducer unit 60, directly on top of exhaust plenum. Temperature probe coupling 68 is positioned within exhaust chamber 46 near exhaust inlet 56. Pipe nipple 72 is positioned within plenum 50.

Figure 8:
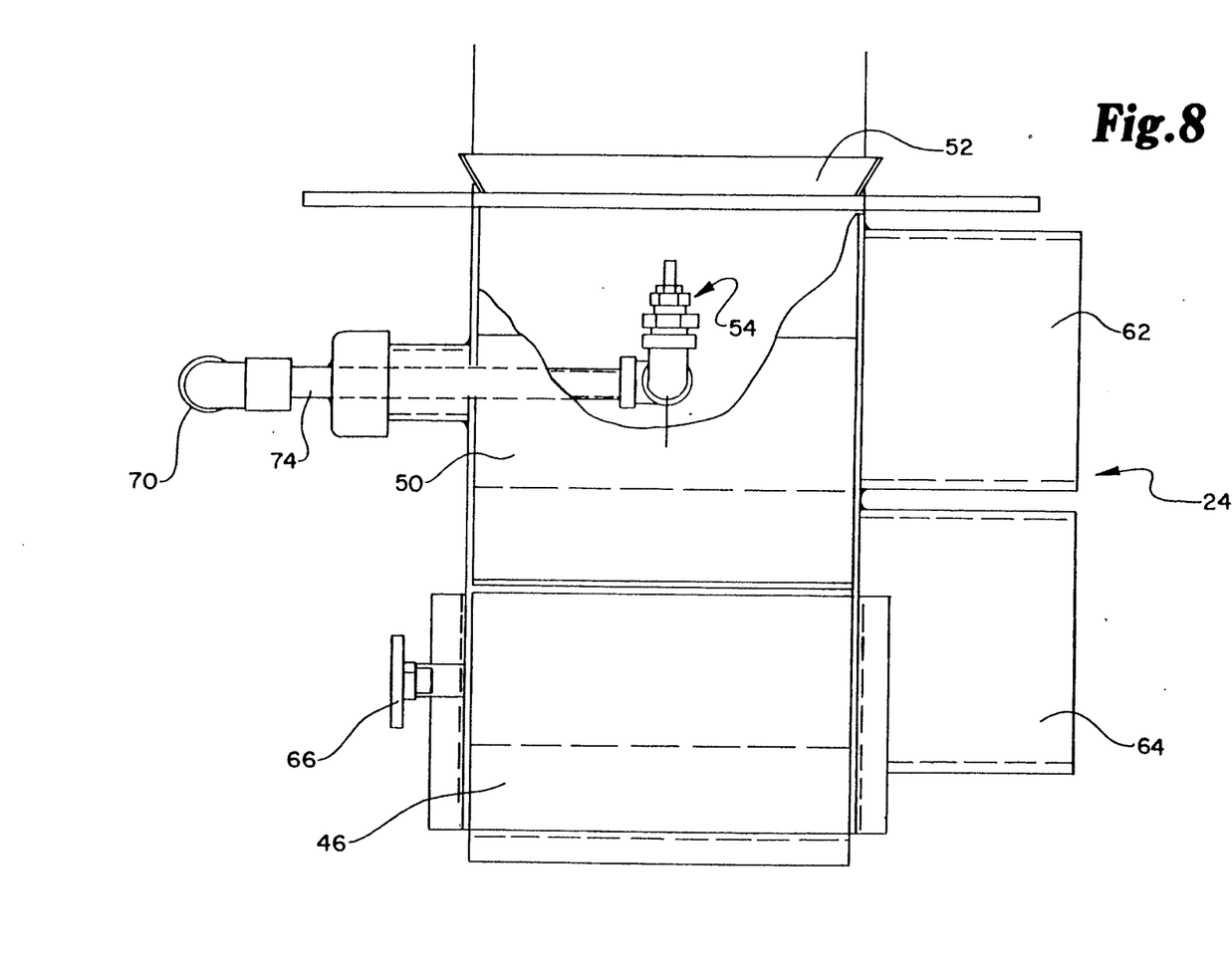
FIG. 8 is a side elevational view of the plenum assembly shown in FIG. 2.
Figure 9:
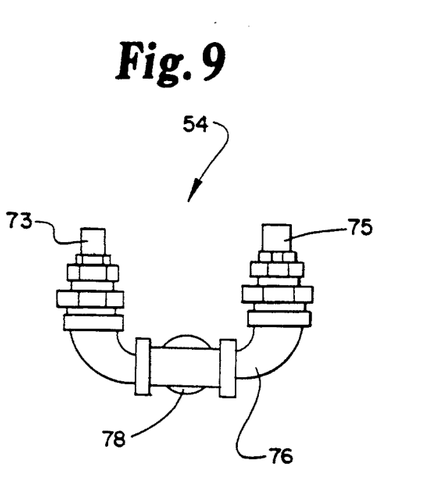
FIG. 9 is a cross sectional view of the sprayer of FIG. 8.

As can be seen in FIG. 8, plenum assembly 24 comprises a plenum inlet 62 and a plenum outlet 64 integrally welded which are received within water scrubber filter box assembly 26 (shown in FIG. 1). Thermometer 66 is received within temperature probe coupling 68, shown in FIG. 7, and can measure temperatures ranging between 200°-1000° F. Contaminated water at connection 70 is received within pipe nipple 72, also shown in FIG. 7. Referring again to FIG. 8, water supply 74 is connected to sprayer 54. Referring to FIG. 9, sprayer 54 can comprise two spray nozzles 73, 75 positioned at either end of an elbow pipe 76. Water supply 74 connects to elbow pipe 76 at tee connector 78.

Figure 10:
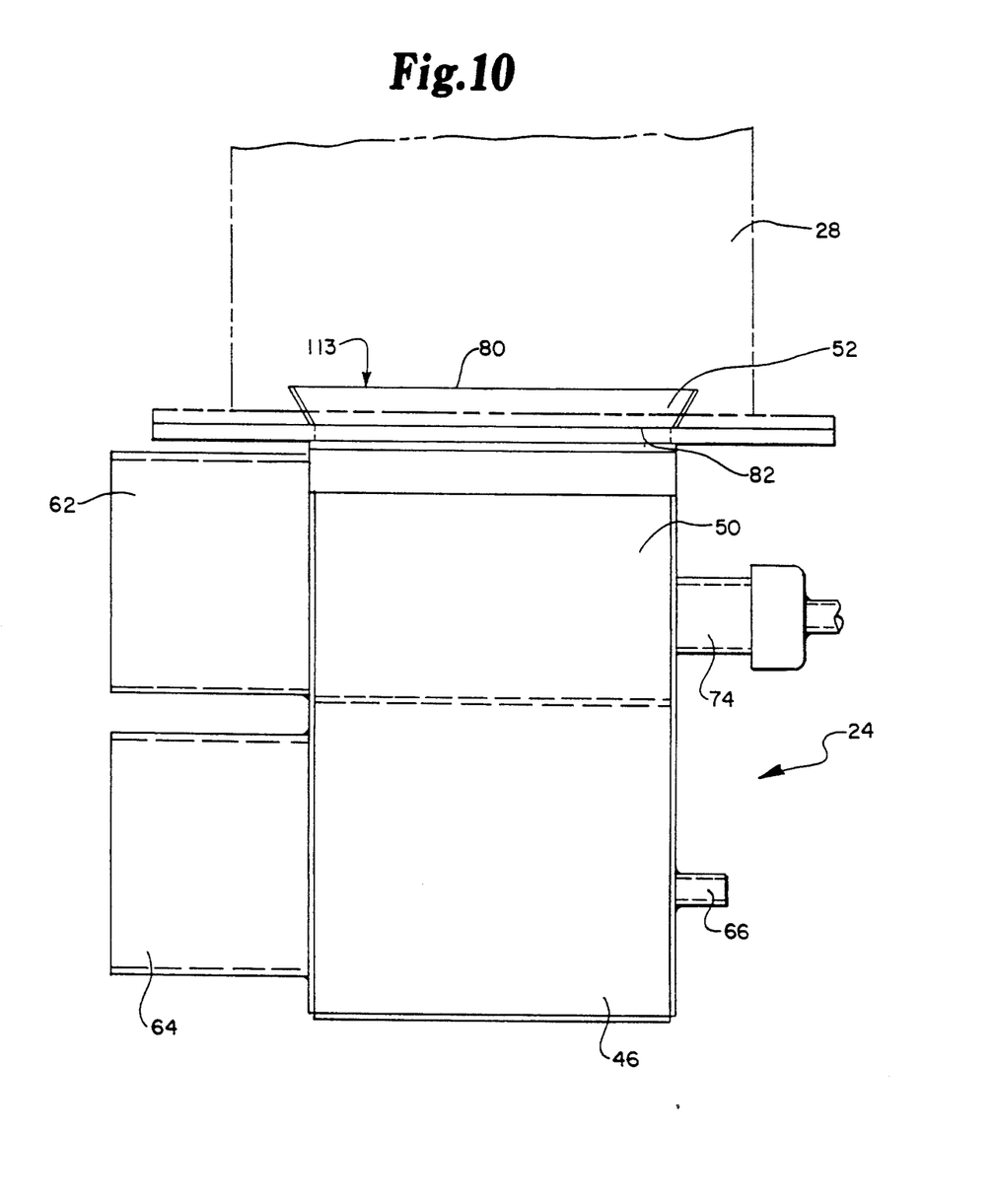
FIG. 10 is a perspective view of the exhaust guide of FIG. 8.
Figure 11:
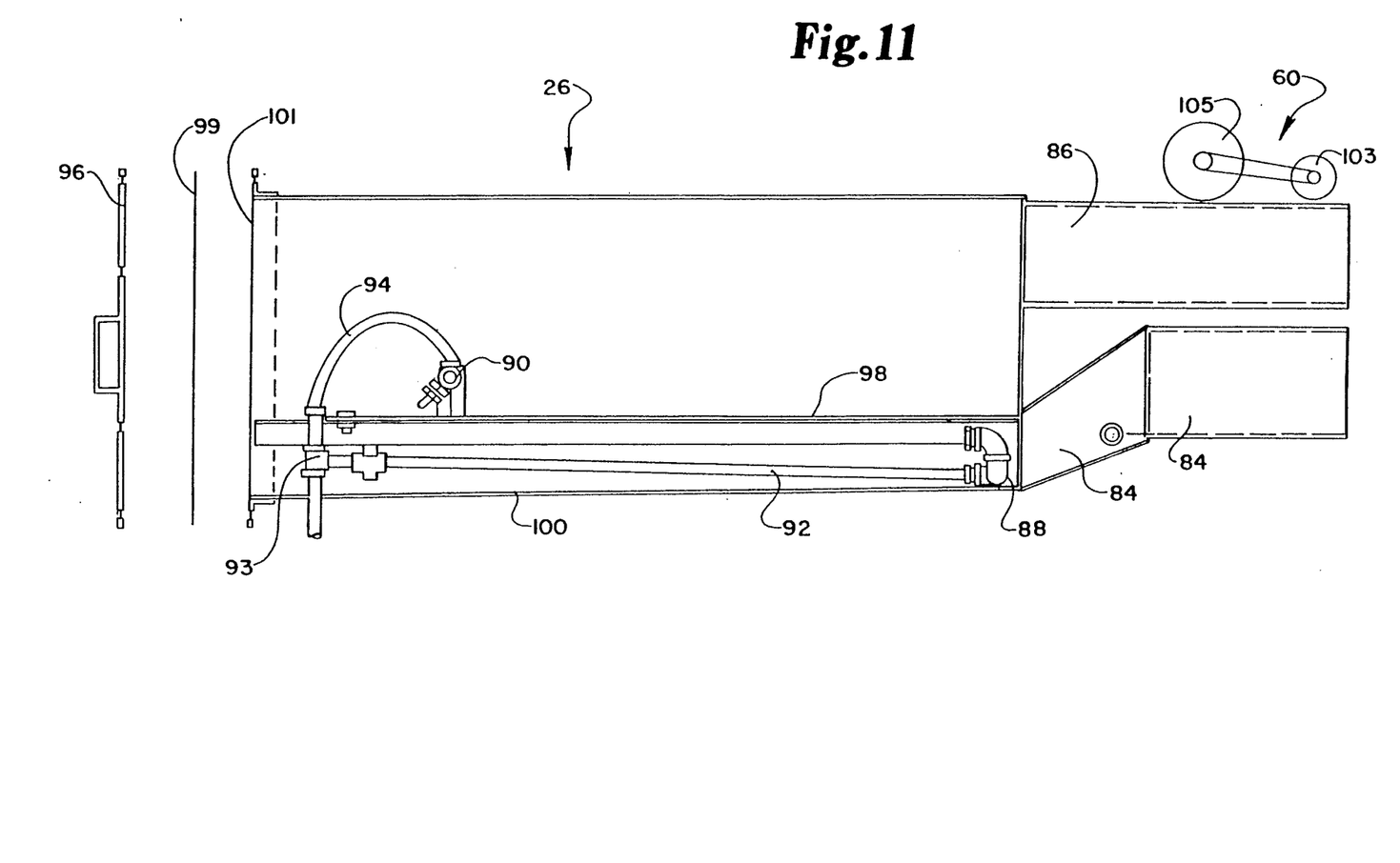
FIG. 11 is a side elevational view of the water scrubber filter box assembly shown in FIG. 1.

The positioning of exhaust guide 52 to afterburner/stack assembly 28 and plenum assembly 24 is shown in more detail in FIG. 10. Draft inducer unit 60, shown in FIGS. 1 and 11, is on the opposite side of afterburner/stack assembly 28. Exhaust guide 52 flares outwardly from plenum assembly 24 toward afterburner/stack assembly 28, so that the upper area 80 of exhaust guide 52 is a larger area than the plenum area 82 of exhaust guide 52.

Plenum assembly 24 is used as a passage for the hydrocarbon gas exiting drum 30, entering and exiting filter box assembly 26, and entering afterburner/stack assembly 28 through exhaust guide 52. Sprayer 54 directs contaminated water toward afterburner/stack assembly 28 at the end of each operation day.

Referring now to FIG. 11, water scrubber filter box assembly 26 is shown in more detail. Filter box assembly 26 broadly comprises filter inlet 84, filter outlet 86, spray nozzles 88, 90, tubing 92, 94, water supply 93, front panel 96, plate 98, and gasket 99. Plate 98, in general, is positioned above filter inlet 84. Spray nozzles 90 are positioned above plate 98, and spray nozzles 88 are positioned beneath plate 98. The number of spray nozzles can be varied to accommodate the size of filter box assembly 26, but it is preferred to use five spray nozzles 90 and four spray nozzles 88. The spray pattern of nozzles 88, 90 is preferably the same, but it is within the scope of the invention to have different spray nozzle patterns. Filter inlet 84 and filter outlet 86 are on an opposing end from front panel 96. Tubing 92 slopes in a downward direction from water source 93 towards spray nozzles 88. Spray nozzles 90 produce a water spray of about two and one-half gallons per minute, whereas spray nozzles 88 utilize about two gallons per minute of water. Filter inlet 84 is slightly elevated and offset in relation to the rest of filter box assembly 26 so that if water collects on floor 100, the water will not go into plenum assembly 24. Floor 100 of filter box assembly 26 is sloped in a downward direction from filter inlet 84 toward water supply 93. Draft inducer unit 60, made up of draft inducer motor 103 and draft inducer fan 105, is positioned above filter outlet 86, on the outside of filter box assembly 26. Gasket 99 is positioned between front panel 96 and end 101 of filter box assembly 26.

Figure 12:
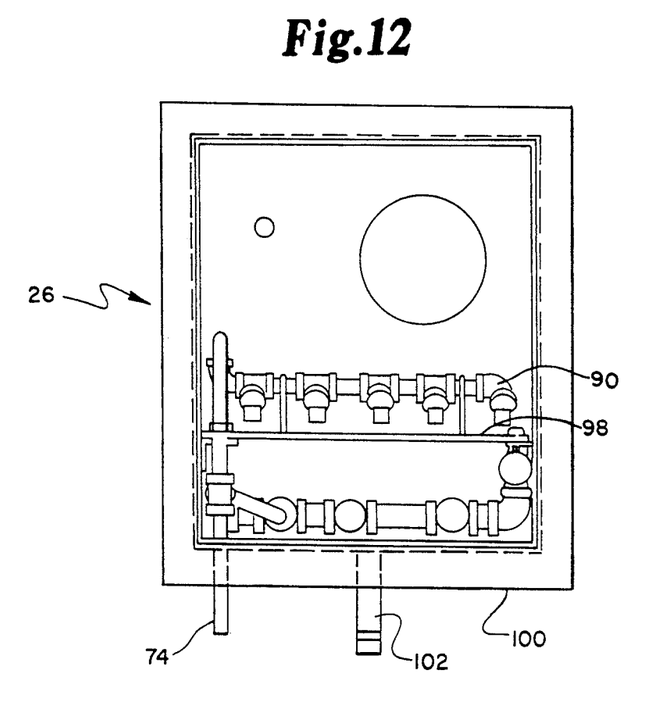
FIG. 12 is a front perspective view of the spray nozzle arrangement in the water scrubber filter box assembly of FIG. 11.

FIG. 12 shows a front view of the filter box assembly 26. Five spray nozzles 90 are positioned above plate 98, and four spray nozzles 88 (not shown) are positioned below plate 98. Drain nozzle 102 is positioned within sloped floor 100.

Figure 13:
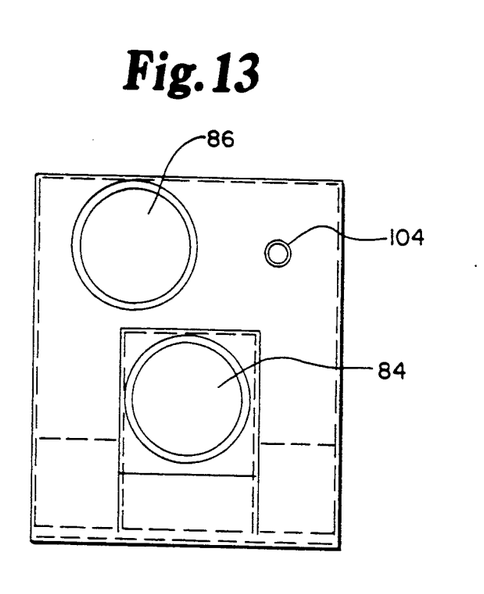
FIG. 13 is a rear elevational view of the water scrubber filter box assembly shown in FIG. 11.

FIG. 13 illustrates a rear view of filter box assembly 26, showing filter inlet 84 and filter outlet 86. Thermocouple coupling 104 is mounted adjacent filter outlet 86.

Water scrubber filter box assembly 28 is utilized to remove dust and dirt particulates from the hydrocarbon gases. The position of draft inducer unit 60 and spray nozzles 90 produce a vortex effect of the hydrocarbon gases, causing movement of the gases toward afterburner/stack assembly 28.

Figure 14:
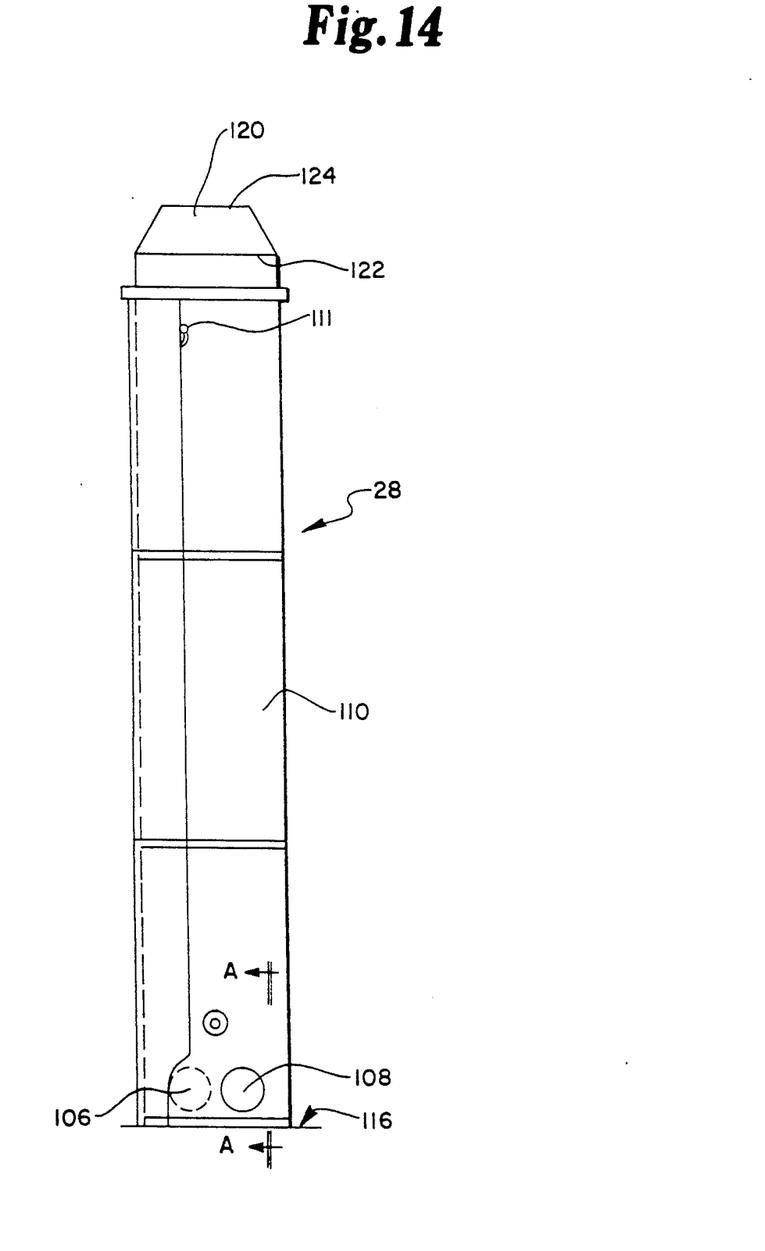
FIG. 14 is a front perspective view of the integral afterburner/stack combination shown in FIG. 1.
Figure 15:
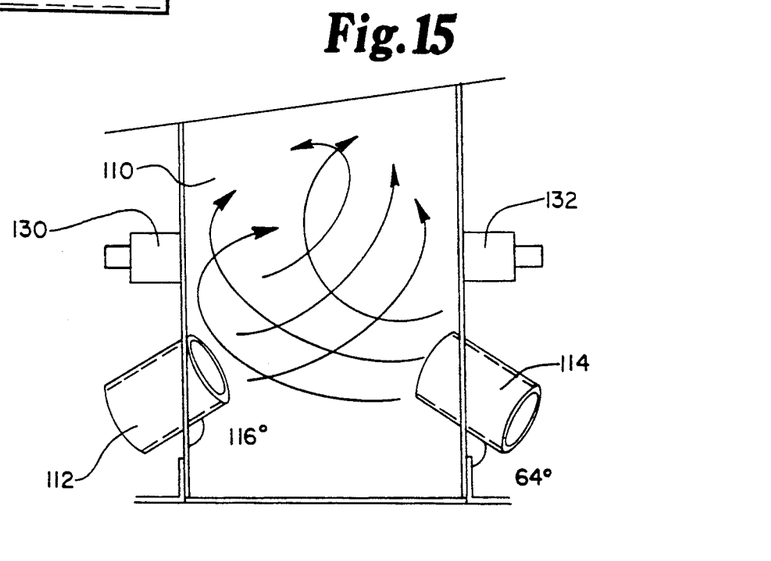
FIG. 15 is a side elevation view of the burner holder of the afterburner-stack combination shown in FIG. 14.

Stack assembly 28 broadly comprises two afterburners 106, 108, stack 110 and burner mounts or holders 112, 114, as shown in FIGS. 14–15. Afterburners 106, 108 are positioned at the base 116 of stack 110, approximately six to ten inches from the bottom of the flue 113, which is a square venturi of the opening of exhaust guide 52, and are securely held in place by burner holders 112, 114. The heat produced by afterburners 106, 108 can be varied by changing the gas pressure to the afterburners depending on the level of contamination of the hydrocarbon gases. Afterburners 106, 108 operate at temperatures between about 1400° F.–1800° F., and preferably between about 1600° F.–1800° F. Thermometer 111 is positioned in stack 110. Burner holders 112, 114 are arranged and positioned within stack 110 so as to be at an angle of about 26° from the horizontal bottom of stack 110, or about 64° and 116° from the wall 118 of stack 110, as shown in FIG. 15. The placement of burner holders 112, 114 are important since this determines the direction of the flame produced and the resulting vortex effect. Since burner holders 112, 114 are offset from one another, the heat causes the gases to move and a vortex effect is produced, which causes the gases to swirl in stack 110, as indicated by the arrows in FIG. 15.

Stack 110 is of a substantially square shape. The emitting end 120 of stack 110 tapers inwardly, being widest at stack end 122 and narrower at neck edge 124. Preferably, stack 110 is an eighteen inch square stack, narrowing to twelve inches at emitting end 120, although these dimensions can be varied. The height of stack 110 is approximately ten feet. Generally, only one stack 110 is utilized with soil roaster system 20.

Afterburner/stack assembly 28 is an integral unit comprising afterburners 106, 108 and stack 110. Burner holders 112, 114 are positioned so that a vortex effect results within stack 110 which causes the gases to swirl within stack 110. As a result of the vortex effect and the shape of emitting end 120, the gases remain in stack 110 for a longer period of time, ensuring a more complete burning of the hydrocarbons.

As shown in FIG. 1, a hydraulic ram 126 is attached to stack/carriage frame 134 and to arm hinges 128. Arm hinges 128 are attached to stack 110 with hinge pins 130, 132 at one end and to stack carriage frame 134 at the other end, and are used to raise and lower afterburner/stack assembly 28.

Drum 30, auger 48, auger feed unit 49, rear drum door 34, and the upward and downward positioning of afterburner/stack assembly 28 using ram 126 are hydraulically operated powered by a diesel power plant. Soil roaster 20 has a 12 volt electric system, draft inducer motor 103 that runs on 110 volts, and a water pump and draft inducer fan 105 which uses 110 volts.

In operation, a one ton quantity of soil contaminated with petroleum, petrochemicals and/or leaded gasoline is loaded into a hopper (not shown). The contaminated soil is then placed on auger feed unit 49. The contaminated soil enters rotating drum 30 on the auger feed unit 49 through auger port 48. As the filled drum tumbler 30 rotates, the soil mixes with air inside drum 30. The contaminated soil is subjected to an intensive thermal treatment by the LP flame of the LPG burner 52 as drum 30 rotates. Damper 58 is closed when the visual absence of steam shows water has been evaporated so that heat is contained within drum 30, thus maintaining a more energy efficient system which uses less LP gas. Inspection hole 51 is utilized to examine various components of the drum 30 interior, including thermometer 47. The contaminated soil is subjected to the thermal treatment and fired or roasted at temperatures between 200° F.–1000° F. Most hydrocarbons found in contaminated soil vaporize or evaporate at temperatures between 350° F.–500° F. Moisture is removed first from the soil in the form of steam. Then low boiling point hydrocarbons, such as benzene, are evaporated. As the dirt continues to be heated, the hydrocarbons are vaporized from the soil. The soil is fired or roasted by the LP flame until it is relatively free of the hydrocarbons which have contaminated it, which occurs when the temperature of the soil begins to increase. Thermometer 47 can be used as a control indicator for temperature fluctuations. The length of the thermal treatment may vary, depending on the type, contamination and/or moisture level of the soil. If the soil is very moist or highly contaminated, the soil will be processed for a longer period of time in drum 30. After the hydrocarbons have been evaporated from the soil, the clean soil is ejected out the back of drum 30 by opening rear drum door 34 using hydraulic cylinder 35 and tilting drum 30 using hydraulic component 33. Soil roaster system 20 of the present invention is a mobile batch processor, which processes one batch of contaminated soil, or other material, at a time, and then empties out the cleaned and restored soil to the site, for use as uncontrolled fill at the site as needed. Approximately four to five tons of soil or other material can be processed per hour using soil roaster system 20. However, if the soil is very moist or highly contaminated, it may only be possible to process about two tons per hour of soil since the soil will be processed and roasted in drum 30 for a longer period of time.

The hydrocarbons that are evaporated from the contaminated soil, which are now in a gaseous state, exit drum 30 and enter exhaust chamber 46 of plenum assembly 24. Plenum assembly 24 is used to direct gases into filter scrubber assembly 26 through plenum outlet 64, and after scrubbing, to afterburner outlet 64, and stack assembly 28 through plenum inlet 62. Thermometer 66 is used to check the temperature of gases going to filter scrubber assembly 26.

The hydrocarbons that are roasted from the soil then go through a water spray processing step in filter box assembly 26 where the water molecules adhere to and remove dust and dirt particulate from the hydrocarbon gases and vapors. The hydrocarbon gases in drum 30 enter exhaust chamber 46, pass through plenum outlet 64 and enter water scrubber filter box assembly 26 through filter inlet 84. As the gases are hit by a water mist from spray nozzles 88, the gas is cooled and the hydrocarbon gas proceeds to the back of filter box assembly 26, is deflected up over plate 98, and spray nozzles 90 produce a water spray mist which hits the hydrocarbon gases, further cooling the gases. As the output from spray nozzles 90 hit plate 98, the water spray, in effect, ricochet toward the back end 101 of filter box assembly 26, creating a water-air vortex, which causes the hydrocarbon gas to spiral in an upward direction. Spray nozzles 88 remove or separate larger dust and dirt particulates from the hydrocarbon gas, provide a wash down effect of floor 100, and create movement of the hydrocarbon gas. Spray nozzles 90 remove additional dust particulates, including particles as small as one micron from the hydrocarbon gas. Suction of less than 0.2 inches results due to the negative pressure created by draft inducer fan 105 on the outside of filter box assembly 26. The negative pressure created by draft inducer fan 105 pushes and causes the swirling hot hydrocarbon gas, which is now preferably cooled to about 150° F., to proceed toward the integral afterburner/stack assembly 28, exiting from filter outlet 86. Thermocouple coupling 104 is utilized to monitor the scrubbed gas temperature at filter outlet 86.

The hydrocarbon gases from which the dust and dirt particulates have been removed pass out of filter box assembly 26 through filter outlet 186, and enter plenum inlet 62 and plenum 50. The flare of exhaust guide 52 creates a venturi effect on the flue 113 between plenum assembly 24 and afterburner/stack assembly 28. Draft inducer fan 105 effectively creates a negative pressure or small vacuum which pushes the gas out of filter box assembly 26 into plenum assembly 24. The hot gases exit through exhaust guide 52 as afterburner/stack assembly 28 creates a pulling effect. Exhaust guide 52 flares in an outwardly direction to start a vortex effect of the gases before the hot gases enter the afterburner/stack assembly 28.

The hot hydrocarbon gases exit exhaust guide 52 and pass by afterburners 106, 108 positioned in stack 110. The intensity of the flame produced by afterburners 106, 108 varies depending on the number of solenoid valves or other means employed to create more or less burner capabilities. The temperatures generally exceed 1400° F., and preferably 1600° F.-1800° F. in stack 110, as measured by thermometer 111. The walls 118 of stack 110 are also heated as a result of the flame produced by afterburner 106, 108 so that there is no hydrocarbon buildup on walls 118 as the gases are burned. Afterburners 106, 108 are arranged and directed such that the rush of LP gas and heat from afterburners 106, 108 and the hot hydrocarbon gases and air entering from exhaust guide 52 create a swirling vortex pattern of the hydrocarbon gases in stack 110, efficiently mixing the flames, hydrocarbon gases, and air. Creation of the vortex causes the hydrocarbon gases to swirl within stack 110, thus keeping the hydrocarbon gas in stack 110 longer. In addition, emitting end 120 of stack 110 constricts the exit of the hydrocarbon gas due to the neck-downed or tapered shape, thereby increasing the residence or dwell time in the stack of the gases. The longer the residence time of the gases in stack 110, the more complete the burning of the hydrocarbon gases will be before the air is emitted into the atmosphere. The addition of oxygen from draft inducer fan 105 to the hydrocarbon gases also aids in the combustion. Afterburners 106, 108 have an average total hydrocarbon destruction efficiency of 99.95 percent. Thus, virtually pure, clean air is emitted into the atmosphere using soil roaster system 20 of the present invention.

Soil roaster system 20 is also very energy efficient and economical. Approximately 21 gallons of liquid propane and one gallon of diesel fuel are used per hour to operate soil roaster system 20. Only the actual amount of liquid propane gas needed to process a particular batch of contaminated soil is utilized, because of the controlled batch process. Continuous feed processes, on the other hand, use vast amounts of liquid propane since the process is running continuously and the temperature of the soil must be raised quickly since the soil is processed in a short, fixed period of time.

In addition, soil roaster system 20 recycles and recirculates the water used in water scrubber filter box assembly 26. Water utilized in the water scrubber filter box assembly 26 to separate and scrub the dust and dirt particles from the hydrocarbon gases is at approximately 90° F. The used water and particulate which collects on floor 100 is discharged from filter box assembly 26 through drain nozzle 102, and is directed through a hose into a centrifuge (not shown) to separate the particulates from the water. The separated water is then placed into a surge/cooling/settling tank. Next, the water is pumped through a liquid propane hot water heat exchanger to cool the water to approximately 50° F. At this point, the recycled water is passed to the water scrubber filter box assembly 26 through water supply 93 to be used again in soil roaster system 20. As a result, soil roaster system 20 uses only 150-200 gallons of water per day. Thus, much less water is utilized using soil roaster system 20 than in other currently known systems since the water is cleaned and then recirculated for use in the system. Other currently marketed systems utilize very large quantities of water, and do not have recirculating systems for the water, except perhaps to a lagoon or tank, without a settling step. In addition, it is advantageous to cool the water to approximately 50° F. since the cooler water holds more dirt and dust particulates than warm or hot water because of the increased surface cohesion effect of cooler water. Thus, the recirculated water can be used more effectively to separate the hydrocarbon gases from dust and dirt particulates.

Soil roaster system 20 may be utilized to process many types of hydrocarbon contaminated materials, including but not limited to soil, ground water, and recycled products. For example, in another embodiment, soil roaster system 20 may be employed without drum 30. In this embodiment, a contaminated material, such as contaminated ground water, which may be in the surge/cooling/settling tank, is hooked up directly to plenum assembly 24 with the connection 70 and nipple 72 into sprayer 54. Sprayer 54 mists out the contaminated water into the afterburner/stack assembly 28. The contaminated water vapor exits out plenum assembly 24, out exhaust guide 52, and through the integral burner/stack assembly 28 to clean the contaminants from the ground water. The contaminants are burned in the afterburner/stack assembly 28, and the water boils off as steam. This type of system is used for the destruction of hydrocarbons picked up in the re-circulated water filter scrubber at the end of each operation day.

The water scrubber filter box assembly 26 of the present invention can also be utilized to remove other particulates from different types of contaminated gaseous materials. The system could be used on some types of incinerators for this purpose.

The size of soil roaster system 20 is also a distinct advantage over other devices. Since only one ton of a material is processed at a time, with the ability to regulate or extend the processing time as necessary, depending on the type of material, a cleaner end product having a higher percentage of hydrocarbon destruction is obtained.

The size of soil roaster system 20 is also important since it can be easily maneuvered to small or compact locations since soil roaster system 20 is about eighteen feet long, seven feet wide, and eight feet in height, with stack 110 lowered. In addition, soil roaster system 20 only weighs about 10,000 pounds.

Mobility of soil roaster system 20 is also significant. The system is mounted on chassis 44, or some type of trailer mounted on twin axles, and can easily be hooked to a truck and moved to the desired location. Stack 110 is lowered or collapsed over soil roaster system 20 using hydraulic ram 126 and arm hinges 128 for ease and movement along a roadway. Thus, a large amount of breakdown time is not required when moving soil roaster system 20 between sites. This presents a substantial improvement over other relatively cumbersome devices. Yet another advantage of soil roaster system is the ease of setup once the system is in the desired location. Hydraulic ram 126 and arm hinges 128 are then again utilized to raise stack 110 from a horizontal to an upright position. Soil roaster system 20 is also very simple and elegant in operation, even when it is only being operated intermittently.

Figure 16:
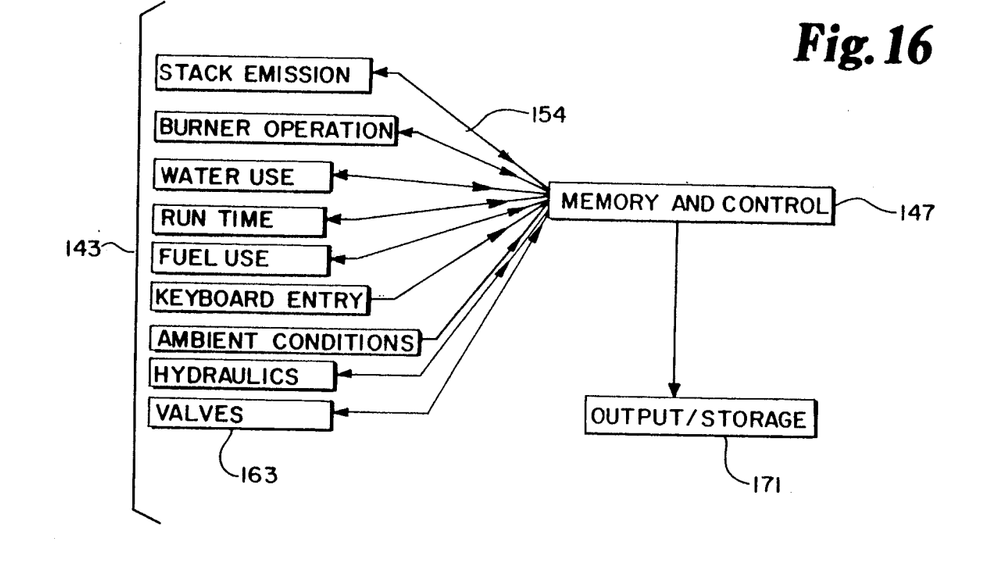
FIG. 16 is a schematic diagram of the data collection and monitoring system.

A further advantage of soil roaster system 20 is, generally, the ease of licensing in a populated area. Often, the provisions of a license permit require that only a particular range of pollutants will be emitted if a system breaks down or fails. Emissions by soil roaster system 20 will likely fall within these narrow provisions because of the smaller size of the system. Yet another advantage of soil roaster system 20 is the ease of providing a data collection and monitoring unit, such as that shown in representative fashion as unit 143 in FIGS. 1 and 16. Although a data collection and monitoring unit 143 is not necessary for operation of system 20, certain licensing authorities and regulatory bodies may require such a unit. Indeed, unit 143 is also useful for maintaining records of the soil batches processed by system 20. FIG. 1 shows unit 143 located proximate burner/stack assembly 28, although the precise attaching location may vary. FIG. 16 discloses a schematic diagram of data collection and monitoring unit 143. In particular, unit 143 comprises memory and control means 147, a plurality of input/output signal lines 154, a plurality of control and monitoring subsystems 163, and output/storage means 171. Control and monitoring subsystems 163 comprise various components or parameters useful for automated control, monitoring, or data collection using unit 143 with soil roaster system 20.

Numerous characteristics and advantages of the invention have been set forth in the foregoing description. It will be understood, however, that this disclosure is, in many respects, only illustrative. Changes may be made in details, particularly in manners of shape, size and arrangement of parts without exceeding the scope of the invention. The invention's scope is, of course, defined in the language in which the appended claims are expressed.

What is claimed is:

1. A batch-type mobile apparatus for processing and cleaning contaminated materials so that contaminants are removed upon intense heating of said material and clean air is discharged, comprising:
   a) tumbler means for containing and rotating said contaminated material;
   b) heat means positioned within said tumbler means for heating said contaminated material such that contaminants are evaporated from said contaminated material;
   c) filter means having a first end and a second end for cleaning and separating said material from said evaporated contaminants with a liquid substance, said filter means operably coupled to said tumbler means at said first end;
   d) burner means operably coupled to said second end of said filter means for receiving said separated evaporated contaminants from said filter means and substantially burning said separated evaporated contaminants so as to obtain clean air;
   e) passage means operably coupled to said filter means and said burner means for conducting said evaporated contaminants to said filter means and to said burner means; and
   f) discharge means having a first end and a second end, said discharge end being operably coupled to said burner means at said first end, said second end including structure defining a restricted opening for increasing dwell time of the contaminants within said discharge means for completely burning and emitting said clean air.

2. The apparatus as set forth in claim 1, wherein said filter means further comprises a plurality of spray nozzle means for further cleaning and cooling of the evaporated contaminants.

3. The apparatus as set forth in claim 2, wherein said filter means utilizes water in said spray nozzle means to clean and separate said material from said contaminants.

4. The apparatus as set forth in claim 3, further comprising an exhaust guide positioned between said passage means and said discharge means, said exhaust guide directing said evaporated contaminants from said passage means to said burner means.

5. The apparatus as set forth in claim 4, wherein said burner means and said discharge means form an integral unit.

6. The apparatus as set forth in claim 7, wherein said burner means are arranged and positioned within said discharge means so as to create a vortex effect of said evaporated contaminants within said discharge means thereby ensuring a more complete burning of said evaporated contaminants within said discharge means.

7. The apparatus as set forth in claim 5, wherein said discharge means is tapered at said second end, such that said evaporated contaminants remain within said discharge means for a period of time.

8. The apparatus as set forth in claim 7, further comprising water recirculation means for cleaning the water used in the apparatus, and recirculating the cleaned water to the filter means, such that the recirculated water removes more dust and dirt particulates when the recirculated water is returned to the filter means.

9. The apparatus as set forth in claim 8, wherein said water recirculation means comprises a centrifuge, a settling tank, and a heat exchanger.

10. The apparatus as set forth in claim 9, wherein the tumbler means comprises a rear door which retains said contaminated material within said tumbler means.

11. The apparatus as set forth in claim 10, wherein said door can be opened to expel said cleaned and separated material.

12. A batch-type mobile apparatus for processing hydrocarbon contaminated soil at a local site so that clean soil is obtained which can be recycled at the site and clean air is emitted into the atmosphere, comprising:

a) a rotatable drum which receives hydrocarbon contaminated soil;

b) a heat source within said drum which heats said contaminated soil within said drum as said drum rotates such that said contaminated soil is heated by said heat source until the hydrocarbons causing the contamination are placed in a gaseous state;

c) a plenum having a first end, a second end, and a third side operably coupled to said drum at said first end for receiving said gaseous hydrocarbons from said drum;

d) a water scrubber filter operably coupled to said second end of said plenum, said water scrubber comprising a plurality of nozzle sprayers for misting and separating said soil from said gaseous hydrocarbons;

e) a burner section comprising a plurality of afterburners coupled to said plenum, said burner section creating a vortex effect of said gaseous hydrocarbons to ensure the complete burning and elimination of said hydrocarbons;

f) a flue operably coupled to said plenum at said third side for directing said gaseous hydrocarbons to said burner section; and g) a stack having a length, a first end and an emitting end, the emitting end having structure defining a restricted opening in said stack said stack operably coupled to said burner section for receiving the vortex of said hydrocarbons, the structure defining the restricted opening thereby increasing the residence time of the hydrocarbons within the stack and completely burning the hydrocarbons so that clean air is emitted.

13. The apparatus as set forth in claim 12, wherein said drum includes a door to retain said contaminated soil within said drum which can be raised or lowered during processing to facilitate the expulsion of the clean soil.

14. The apparatus as set forth in claim 13, wherein said burner section and said stack are an integral unit.

15. The apparatus as set forth in claim 14, wherein said stack can be hydraulically raised or lowered between a vertical and a horizontal position.

16. The apparatus as set forth in claim 14, further comprising a water decontamination system operably coupled to said water scrubber filter and to said plenum for cleaning the water used in the apparatus, and recirculate the cleaned water to the water scrubber filter for use.

17. The apparatus of claim 12, wherein the stack is substantially square in shape throughout the length of said stack.

18. The apparatus of claim 17, wherein said structure defining said restricted opening includes an inwardly extending flange such that said flange has a smaller opening than said stack.

* * * * *